Aug. 23, 1938.  S. M. NAMPA  2,127,613
CAR LOADING DEVICE
Filed May 28, 1936  2 Sheets-Sheet 1
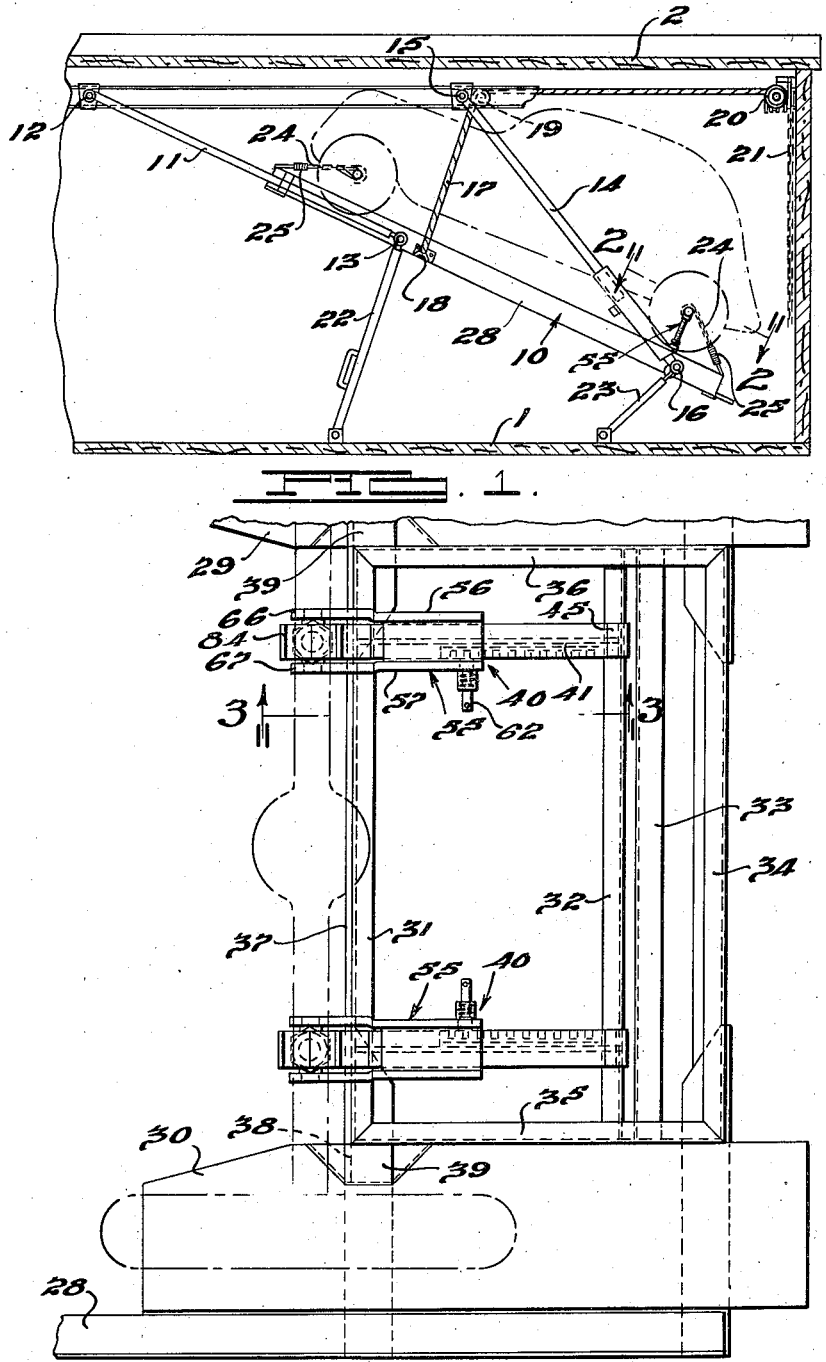
INVENTOR
Sulo M. Nampa.
BY
Harness, Dickey, Pierce & Hann.
ATTORNEYS.

Aug. 23, 1938.    S. M. NAMPA    2,127,613
CAR LOADING DEVICE
Filed May 28, 1936    2 Sheets-Sheet 2
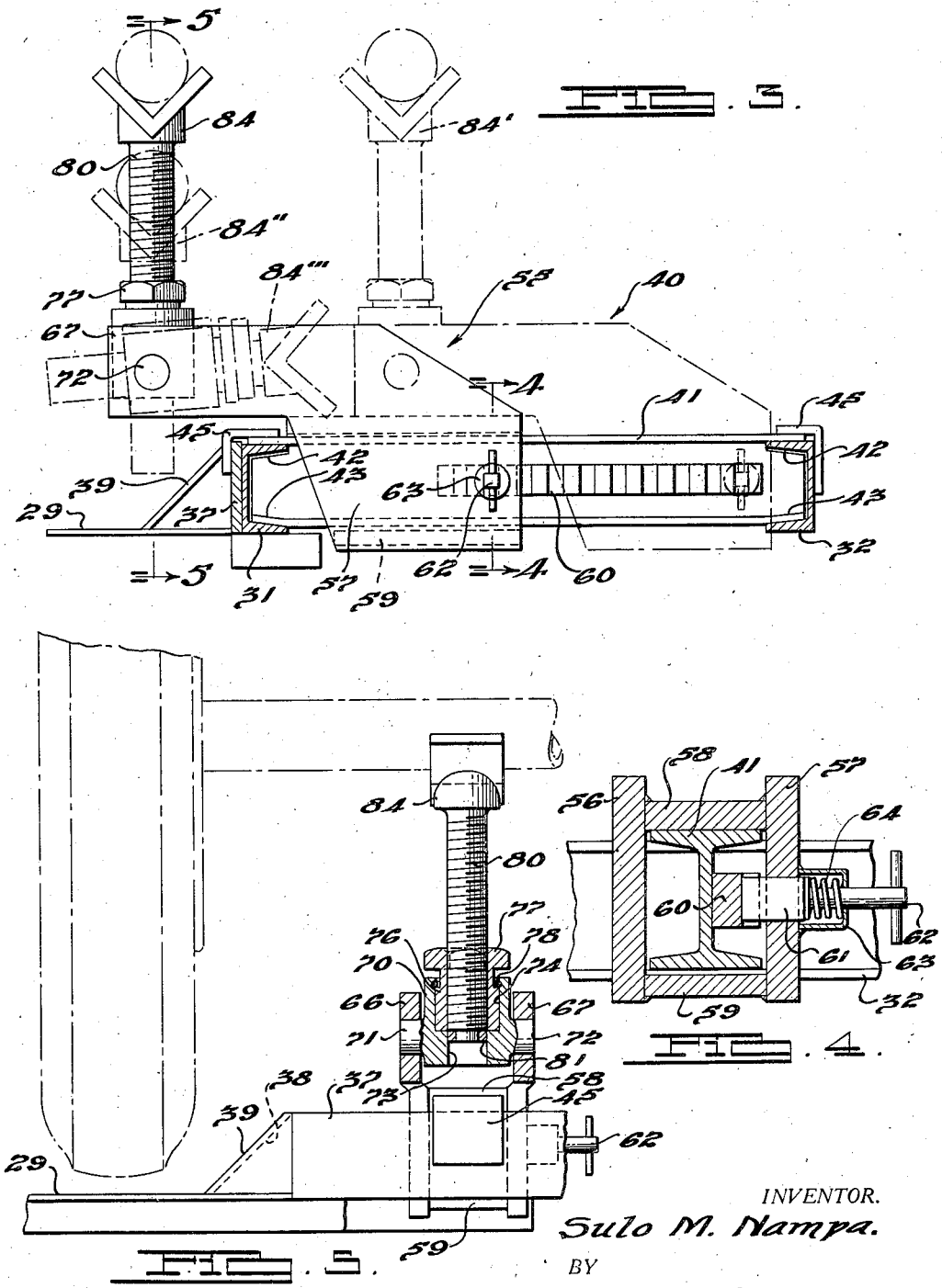
INVENTOR.
Sulo M. Nampa.
BY
Harness, Dickey, Pierce & Hann.
ATTORNEYS.

Patented Aug. 23, 1938

2,127,613

UNITED STATES PATENT OFFICE 2,127,613

CAR LOADING DEVICE

Sulo M. Nampa, Detroit, Mich., assignor to The Worth Company, Detroit, Mich., a corporation of Michigan Application May 28, 1936, Serial No. 82,165

12 Claims. (Cl. 105—368)

This invention relates to car loading devices and particularly to the type of loading device disclosed in the copending application of Samuel D. Butterworth, Serial No. 646,830, filed December 12, 1932.

In accordance with the aforementioned Butterworth application, an automobile is supported by its wheels on a frame which is adapted to assume an elevated inclined position. It has been found that in certain cases, the inclination of the automobile places an unusually heavy load upon the bearings of the wheels at the lower end of the automobile, and this fact combined with the severe jolting movement of the freight car and the fact that the wheels of the automobile are not rotating, has in some instances caused injury to such bearings. In the copending application of Leo A. Eckermann, Serial No. 49,873, filed November 15, 1935, is disclosed means for overcoming this difficulty, which means comprises a pair of jacks pivotally mounted upon the loading frame and adapted to be swung into an operative position wherein they may elevate the rear wheels of the automobile above the frame.

It has been found that it is desirable in a construction of the type shown in the aforementioned Eckermann application to provide means for adjusting the jack mechanism laterally of the frame in order that they may engage at different points on the axle of an automobile. Such adjustments are required by reason of variations in the construction of the rear axle in different cars, as well as the position of the rear springs thereon. It has also been found advisable to provide means for shifting the position of the jack longitudinally of the frame in order that cars of varying lengths may be centrally positioned upon the frame where the load is most effectively supported.

Accordingly, it is the object of the present invention to provide an improved jack mechanism for elevating the rear wheels of an automobile on the loading frame, which mechanism is pivotally connected to the frame in order that it may be swung out of the way when the frame is elevated and may be adjusted both laterally and longitudinally of the frame to accommodate automobiles of varying sizes and characteristics.

It is a further object of the invention to provide a means of the character described which will permit a limited longitudinal movement of the automobile upon the frame during transportation in order to reduce the stresses caused by longitudinal shocks upon the freight car.

A further object is to provide a device of this character which is simple, rugged and easy to operate.

Other objects and advantages of the invention will become apparent from the following specification and the claims hereinafter set forth.

For a better understanding of the invention, reference may be had to the accompanying drawings forming a part of the specification, wherein:

Figure 1 is a longitudinal sectional view of one end of a freight car illustrating the car loading mechanism in its loaded condition.

Figure 2 is a partial plan view taken on the line 2—2 of Figure 1.

Figure 3 is a partial longitudinal section taken on the line 3—3 of Figure 2 showing the jack mechanism in several of its adjusted positions.

Figure 4 is a transverse section taken on the line 4—4 of Figure 3.

Figure 5 is a transverse section taken on the line 5—5 of Figure 3.

Referring to Figure 1, a frame indicated generally at 10 is provided for supporting an automobile during shipment in a freight car having a floor 1 and a roof 2. This frame is mounted for swinging movement in the freight car by means of a pair of solid rods 11 pivotally connected at 12 adjacent the roof of the car, and at 13 to the forward end of the frame, and a pair of telescoping rods 14 pivoted to the car adjacent the roof thereof at 18 and to the lower end of the frame at 16. By means of these connecting rods the frame may be swung into a position upon the floor of the car for loading and unloading purposes.

A pair of cables 17 are connected respectively at opposite sides of the frame 10, as indicated at 18, and extend over fixed pulleys 19 to drums 20. The drums form part of a hoist mechanism which may be operated by chain 21 to wind the cables on the drums and thus elevate the loading frame to the position shown in Figure 1. At this time, suitable thrust members 22 and 23 may be placed in position between the floor 1 of the freight car and the pivots 13 and 16, respectively, of the loading frame. The automobile is secured in place upon frame 10 by chains 24 connected to the frame and to the axles of the vehicle. The chains are provided with coiled springs 25 adapted to permit a limited longitudinal movement of the automobile relative to the frame to cushion the frame and automobile against longitudinal shock.

When it is desired to use the freight car for other purposes than loading automobiles, the loading frame may be swung into a position parallel with and in close proximity to the roof 2 of the car. This is accomplished by winding additional lengths of cables 17 on drums 20. During this further elevating movement of the frame, telescoping rods 14 will be reduced in length, the telescoping portion being provided for this purpose.

Referring to Figure 2, the frame 10 comprises a pair of longitudinal side frame members 28 and carries integrally secured thereto wheel supporting plates 29 and 30 for supporting the rear wheels of the vehicle positioned on the frame. Similar plates, not shown, are mounted at the forward end of the frame and are adapted to receive and support the front wheels of the vehicle. An end frame structure shown in Figure 2 is integrally secured to and forms a permanent part of the main frame 10, and includes transverse channel frame members 31, 32, 33 and 34 and longitudinal channel members 35 and 36 which extend along the inner edges of the supporting plates 30 and 29, respectively, and are welded to the ends of members 31, 32, 33 and 34.

The frame structure so far described is similar to that disclosed in the aforementioned Butterworth and Eckermann applications. In the present construction, however, this frame structure is additionally reinforced by a transverse plate 37 which is welded to the forward face of channel member 31 and extends beyond the end of that channel member. The extremities of reinforcing plate 37 are beveled at 38, as best shown in Figure 5, and a bent plate 39 is welded to each beveled edge 38 of plate 37. Plates 39 are each shaped in the form of a fragment of three sides of a pyramid extending downwardly in inclined planes towards the wheel supporting plates 29 or 30, and are welded thereto and to the top edges of channel members 35 and 36 respectively. These bent plates 39 serve to guide the wheels of the vehicle into a central position with respect to the frame, and additionally reinforce and stiffen the wheel supporting plates 29 and 30.

Supported by and between transverse channel members 31 and 32 are a pair of jack supporting mechanisms indicated generally at 40. Since these mechanisms are identical, the description of only one will suffice. Each of the jack supports includes a longitudinal I-beam 41 of a length slightly less than the distance between the webs of the channel members 31 and 32. The web of the I-beam 41 is notched at 42 adjacent the upper flange of the I-beam at each end to provide recesses in which the upper flanges of the channel members 31 and 32 may be received, as best shown in Figure 3. Adjacent the lower flange of the I-beam 41, at each end, a portion of the web is cut away and the adjacent end flange portions 43 are bent upwardly, as shown in Figure 3, in order that they may rest and ride upon the lower flanges of the respective channel members 31 and 32. A pair of angled retaining plates 45 are welded to the top surface of the upper flange of the I-beam 41 and extend downwardly over the outer faces of the channel member 32 and reinforcing bar 37, respectively. These retaining plates 45 prevent cocking of the I-beam between the two channel members 31 and 32, and hence serve to prevent removal thereof.

There is provided a longitudinally sliding jack support indicated generally at 55, which comprises a pair of side plates 56 and 57 positioned on opposite sides of the I-beam 41, and connected by a top plate 58 and a bottom plate 59, the plates 56, 57, 58 and 59 being integrally secured together by welding and completely enclosing the I-beam. The dimensions of member 55 are such that it is free to slide longitudinally on the I-beam, and means are provided for retaining it in longitudinally adjusted position, which means comprises a rack 60 welded to one side of the web of the I-beam and a detent 61 movable transversely of the frame in a suitable opening in the side plate 57. As best shown in Figure 4, the detent mechanism is provided with an operating handle 62 and a housing 63 welded to the frame and enclosing a spring 64 which normally urges the detent into engagement with the space between two of the teth in the rack 60 for retaining the jack support in longitudinally adjusted position.

The side plates 56 and 57 of member 55 extend above and rearwardly of the channel member 31 and reinforcing plate 37 at 66 and 67, respectively, and a jack housing 70 is pivotally carried by the rearward extensions 66 and 67 by means of integral trunnions 71 and 72 journaled in suitable openings in extensions 66 and 67, as best shown in Figure 5. The jack housing 70 has a longitudinal bore 73 and an enlarged counterbore 74 communicating therewith. Rotatably mounted in the counterbore 74 is an internally threaded jack operating sleeve 76 which is provided with a head 77 having faces adapted for engagement with a wrench to be used in elevating the jack. A spring retaining ring 78 is seated within an internal groove in the counterbore 74 and is adapted to project partially outwardly into the counterbore and to engage with a shoulder on the jack operating sleeve 76 to prevent removal of the latter. A jack stem 80 is threaded into the jack operating sleeve 76 and extends freely through the bore 73 in the jack housing. The lower end of the jack stem 80 is provided with a reduced portion upon which is welded a retaining ring 81 which operates to prevent withdrawal of the jack stem from the jack operating sleeve 76. The upper end of the jack stem 80 is provided with an axle engaging head 84 adapted to engage and support the rear axle of a vehicle positioned on the frame.

By reason of the structure just described, it is apparent that the two jack mechanisms may be shifted either longitudinally or transversely with respect to the frame member to accommodate themselves for automobiles of varying sizes and characteristics. When the jack is adjusted to the desired longitudinal position, detent 61 engages rack 60 and prevents displacement thereof. Lateral displacement of the jack mechanism is resisted by friction between the jack supporting I-beam 41 and the channel members 31 and 32. This friction is sufficient to hold the mechanism against displacement during transportation of an automobile, but if desired a suitable detent mechanism of the type shown at 60 to 64 may be provided to prevent lateral displacement in the same manner as longitudinal displacement is prevented in the construction shown.

Referring to Figure 3, the solid lines illustrate the axle supporting head 84 in its rearmost and uppermost position, while the dotted line position indicated at 84' indicates the foremost position of the jack head, while in its uppermost position. It is apparent that the jack head may be lowered in any of the longitudinal positions to a point corresponding to that indicated at 84'', and that the jack may be pivotally swung into an inoperative position shown at 84''' when the loading frame is to be elevated into proximity with the roof of the freight car. There is thus provided a very flexible mechanism for supporting the automobile with its rear wheels elevated above the frame, and a mechanism of this type which may be swung into a position substantially in the plane of the frame when the frame is elevated into proximity with the roof of the car. In addition all of the parts are permanently connected to the loading frame so that none can be lost or displaced during use.

It will be observed that when the loading device is in operative position, as shown in Figure 1, the jacks are free to swing about their transverse trunnion axes with movements of the automobile relative to the frame. This is an exceedingly important feature inasmuch as the chains 24 which hold the automobile against displacement from the frame are provided with spring sections 25 in order that a limited longitudinal movement of the automobile upon the frame may take place. This materially reduces the stresses and shocks due to longitudinal jolting of the freight car, and is necessary in a loading device of the type here involved to insure against injury to the automobile or breakage of the loading device.

While only one embodiment of the invention is shown and described herein, it is apparent that variations may be made therein within the spirit of the invention as described herein and set forth in the appended claims.

What is claimed is:

1. In an automobile loading device, a frame for supporting an automobile in an elevated position, means carried by the frame for longitudinal movement thereon, an automobile supporting device pivotally carried by said means on a transverse axis and engageable with one end of the automobile to support it in elevated position with respect to the frame, and yielding means for securing the automobile on the frame, said yielding means being adapted to permit a limited longitudinal movement of the automobile on the frame and an incidental limited pivotal movement of said device when the device is in automobile supporting position.

2. In an automobile loading device, a frame for supporting an automobile in an elevated position, means carried by the frame for transverse movement thereon, an automobile supporting device pivotally carried by said means on a transverse axis and engageable with one end of the automobile to support it in elevated position with respect to the frame, and yielding means for securing the automobile on the frame, said yielding means being adapted to permit a limited longitudinal movement of the automobile on the frame and an incidental limited pivotal movement of said device when the device is in automobile supporting position.

3. In an automobile loading device, a frame for supporting an automobile in an elevated position, means carried by the frame for longitudinal and transverse movement thereon, an automobile supporting device pivotally carried by said means on a transverse axis and engageable with one end of the automobile to support it in elevated position with respect to the frame, and yielding means for securing the automobile on the frame, said yielding means being adapted to permit a limited longitudinal movement of the automobile on the frame and an incidental limited pivotal movement of said device when the device is in automobile supporting position.

4. In an automobile loading device, a frame for supporting an automobile in an elevated position, means carried by the frame for longitudinal movement thereon, an automobile elevating jack pivotally carried by said means on a transverse axis and engageable with one end of the automobile to support it in elevated position with respect to the frame, and yielding means for securing the automobile on the frame, said yielding means being adapted to permit a limited longitudinal movement of the automobile on the frame and an incidental limited pivotal movement of said jack when the jack is in automobile supporting position.

5. In an automobile loading device, a frame for supporting an automobile in an elevated position, means carried by the frame for transverse movement thereon, an automobile elevating jack pivotally carried by said means on a transverse axis and engageable with one end of the automobile to support it in elevated position with respect to the frame, and yielding means for securing the automobile on the frame, said yielding means being adapted to permit a limited longitudinal movement of the automobile on the frame and an incidental limited pivotal movement of said jack when the jack is in automobile supporting position.

6. In an automobile loading device, a frame for supporting an automobile in an elevated position, means carried by the frame for longitudinal and transverse movement thereon, an automobile elevating jack pivotally carried by said means on a transverse axis and engageable with one end of the automobile to support it in elevated position with respect to the frame, and yielding means for securing the automobile on the frame, said yielding means being adapted to permit a limited longitudinal movement of the automobile on the frame and an incidental limited pivotal movement of said jack when the jack is in automobile supporting position.

7. In a car loading device, an adjustable jack mechanism adapted for use on a loading frame, comprising a supporting bar, means adjustable longitudinally along said bar, and an elevating jack mechanism pivotally carried by said means.

8. In a car loading device, an adjustable jack mechanism adapted for use on a loading frame comprising a sub-frame, a member movable transversely of said sub-frame and carried thereby, a jack support carried by said member for longitudinal movement thereon, and an elevating jack mechanism pivotally secured to said support.

9. In an automobile loading device, a frame for supporting an automobile in elevated position, means carried by the frame for longitudinal and transverse movement thereon, an automobile supporting device pivotally carried by said means and engageable with the automobile for supporting one end thereof in elevated position with respect to the frame, and resilient means for limiting pivotal movement of said device when it is in supporting engagement with the automobile.

10. In an automobile loading device, a frame for supporting an automobile in elevated position, means carried by the frame for longitudinal movement thereon, an automobile elevating jack pivotally carried by said means and adapted to elevate and support one end of the automobile with respect to the frame, and resilient means for limiting pivotal movement of said jack when it is in supporting engagement with the automobile.

11. In an automobile loading device, a frame for supporting an automobile in elevated position, means carried by the frame for transverse movement thereon, an automobile elevating jack pivotally carried by said means and adapted to elevate and support one end of the automobile with respect to the frame, and resilient means for limiting pivotal movement of said jack when it is in supporting engagement with the automobile.

12. In an automobile loading device, a frame for supporting an automobile in elevated position, means carried by the frame for longitudinal and transverse movement thereon, an automobile elevating jack pivotally carried by said means and adapted to elevate and support one end of the automobile with respect to the frame, and resilient means for limiting pivotal movement of said jack when it is in supporting engagement with the automobile.

SULO M. NAMPA.